United States Patent [19]

Maier et al.

[11] Patent Number: 4,836,583
[45] Date of Patent: Jun. 6, 1989

[54] PIPE CONNECTION FOR INSTRUMENTS OR MACHINES

[75] Inventors: Hans P. Maier; Nikolay Vlaykowski, both of Villingen-Schwenningen, Fed. Rep. of Germany

[73] Assignee: Agintec AG, Pfaeffikon, Switzerland

[21] Appl. No.: 837,771

[22] Filed: Mar. 10, 1986

[30] Foreign Application Priority Data

Mar. 8, 1985 [DE] Fed. Rep. of Germany ....... 3508287

[51] Int. Cl.$^4$ ............................................. F16L 17/00
[52] U.S. Cl. ................................... 285/336; 285/340; 285/341; 285/368
[58] Field of Search ............... 185/336, 340, 348, 341, 185/368, 414, 910

[56] References Cited

U.S. PATENT DOCUMENTS

| | | | |
|---|---|---|---|
| 2,466,294 | 4/1949 | Allen | 285/336 X |
| 2,704,676 | 3/1955 | Harding | 285/340 X |
| 3,365,219 | 1/1968 | Nicolaus | 285/340 |
| 3,503,633 | 3/1970 | Braun et al. | 285/336 X |

FOREIGN PATENT DOCUMENTS

| | | | |
|---|---|---|---|
| 601150 | 7/1960 | Canada | 285/340 |
| 3206570 | 9/1983 | Fed. Rep. of Germany | 285/336 |

Primary Examiner—Randolph A. Reese
Assistant Examiner—Anthony Knight
Attorney, Agent, or Firm—Foley & Lardner, Schwartz, Jeffery, Schwaab, Mack, Blumenthal & Evans

[57] ABSTRACT

A pipe connection for instruments or machines, with a flange on the machine side, which has a means of attachment for connecting a flange on the pipe side. The pipe connection is easy to install and can withstand a great amount of stress, and has the following characteristics as primary elements: (a) a free pipe socket is provided on the machine side; (b) the flange on the pipe side, a clamp element, and a chamber part are loosely pushed onto the butted pipe end, and these can be pressed together by the means of attachment; (c) a seal surrounds the joint between the socket and the pipe end, and both axial ends of this seal project into a seal chamber; (d) the flange on the pipe side and the chamber part between them form a clamp chamber into which the clamp element is inserted; and (e) the clamp edge radially interior to the clamp element rests on the pipe end, is overlapped, with respect to a clamp edge which is radially on the exterior, by a clamp surface of the clamp chamber, and projects out of the clamp chamber in an axial direction in such a way that an axial pressure applied to the clamp element results in an increase in the exterior diameter and a decrease in the interior diameter of the clamp element.

12 Claims, 7 Drawing Sheets

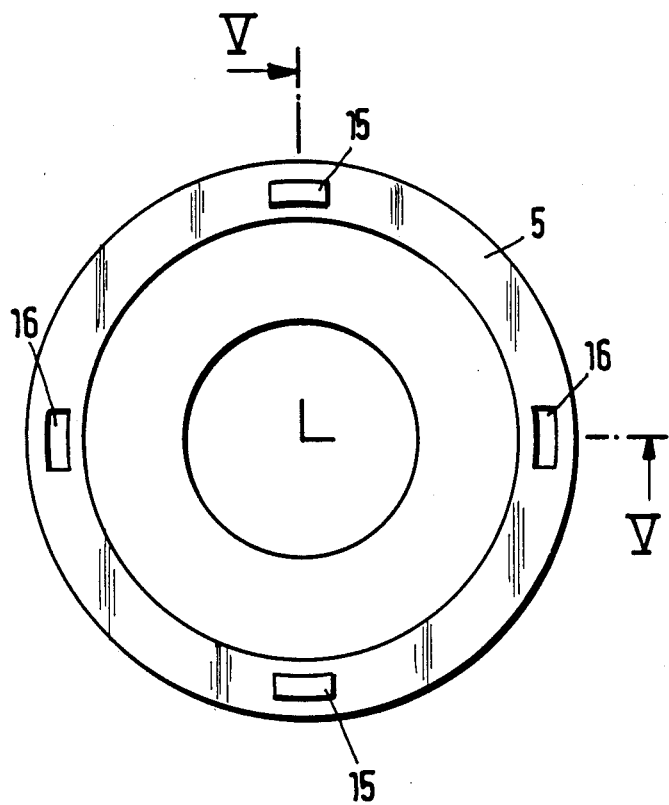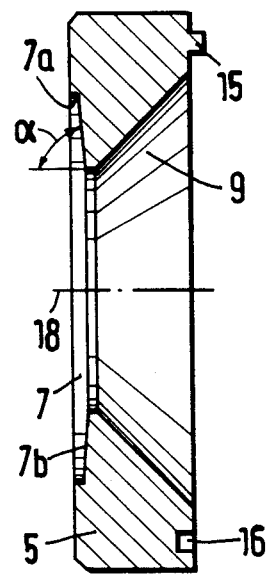

PIPE CONNECTION FOR INSTRUMENTS OR MACHINES

DISCLOSURE OF THE INVENTION

The invention concerns a pipe connection for instruments or machines, with a flange on the machine side, which has means of attachment allowing connection of a flange on the pipe side.

Instrument housings are generally cast with integrated standard flanges, and these flanges can comprise up to 50% of the total weight of an instrument. Instruments which are cast with only a smooth socket require complicated pipe connections.

The object of the invention is to device a pipe connection for instruments or machines which is easy to install and can withstand a great amount of stress.

This object is achieved by a pipe connection for connecting an instrument or machine to a pipe end, the connection comprising (a) a free socket having an outer perimeter and connected to a machine, the free socket forming a butt joint with a pipe end, (b) a first chamber member surrounding the pipe end and including a first seal chamber, (c) a first flange fitted on the pipe end adjacent the first chamber member at a side opposite the butt joint, (d) a second flange surrounding the free socket, (e) a seal received in the first seal chamber, (f) a first clamp chamber formed between the first chamber member and the first flange and having a first clamp surface (g), a first clamp element positioned in the first clamp chamber and having inner and outer clamp edges defining respectively inner and outer diameters, the inner clamp edge being engageable with the pipe end, and (h) means for applying an axial pressure to the clamp element, thereby increasing the outer diameter and decreasing the inner diameter to form a clamping seal on the pipe end.

BRIEF DESCRIPTION OF THE DRAWINGS

For a complete understanding of the invention, the description should be read in conjunction with the drawings, which show some exemplary embodiments of the invention, and wherein:

FIG. 4 shows a top view of a different embodiment of a chamber part;

FIG. 5 shows a cross-section along line V-V in FIG. 4

DETAILED DESCRIPTION OF THE PREFERRED EMBODIMENTS

Figure 1:
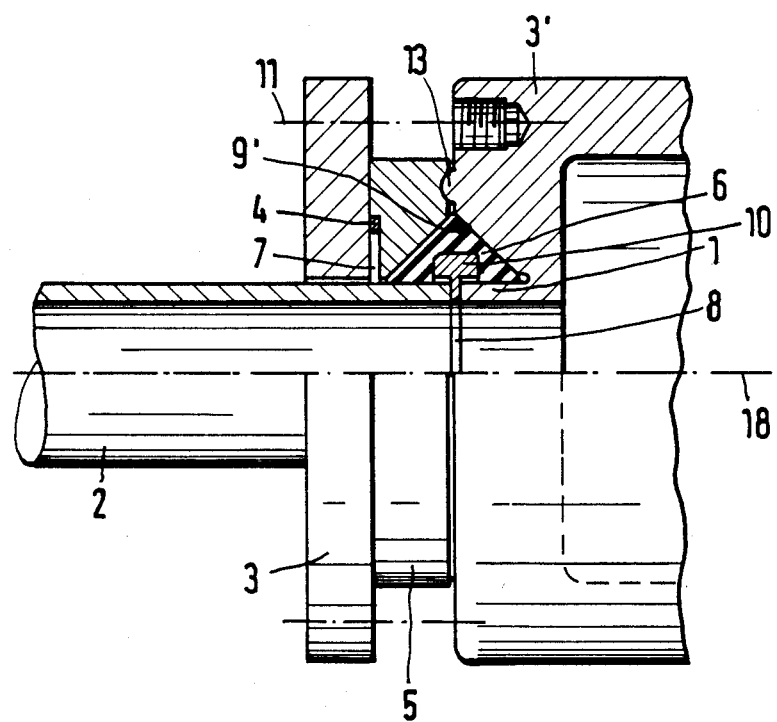
FIG. 1 shows a longitudinal section of a pipe connection with a fixed flange on the machine side.

The invention described hereinbelow has the following features:

(a) a free socket is provided on the machine side;

(b) the flange on the pipe side, a clamp element, and a chamber part are loosely pushed onto the butted pipe end, and these can be pressed together by said means of attachment;

(c) a seal surrounds the joint between the socket and the pipe end, and both axial ends of this seal project into a seal chamber;

(d) the flange on the pipe side and the chamber part between them form a clamp chamber into which the clamp element is inserted;

(e) the clamp edge radially interior to the clamp element rests on the pipe end, is overlapped, with respect to a clamp edge which is radially on the exterior, by a clamp surface of the clamp chamber, and projects out of the clamp chamber in an axial direction in such a way that axial pressure applied to the clamp element results in an increase in the exterior diameter and a decrease in the interior diameter of the clamp element.

The aforementioned flange on the machine side can also be a section of the housing or the like.

The new pipe connection can be installed onto smooth pipe ends which have simply been deburred, the only installation tools required being suitable wrenches for the threaded connections. This makes welding, soldering, or screwing the flanges on unnecessary. The new pipe connection can not only be easily installed, it can also be just as easily removed, and can be reused many times, with all its individual parts, with the exception of the seal. Since the individual parts only have to be set into place and pressed together by means of threaded connections, all of the protective measures required in explosion-proof environments can be eliminated. The pipe connection is built relatively small and leads to weight savings of over 40% compared to conventional flange connections.

For a special embodiment, it is advantageous that the chamber part on the pipe side be supported on the flange on the machine side, which is fixed in place and which has a seal chamber for the matching axial end of the seal, with this seal chamber forming the socket at the same time. The one seal chamber is thus integrated into the flange present on the machine side or section of housing, with the seal chambers preferably having a conical shape.

It is advantageous that the annular contact surface between the chamber part and the flange on the machine side have a crowned shape. In this way, the pipe end to be connected can be positioned at an angle to the socket on the machine side. It is also possible, however, to do without a flange that is an integral part of, and fixed in place on, the instrument or machine. In this case, according to the invention, a chamber part and a clamp element are also loosely pushed onto the socket on the machine side. The sealing force applied to the seal is produced by the threaded connection which presses the two flanges against each other when force is applied to the two chamber parts in an axial direction directly by the two flanges, or by the clamp elements. But provision can also be made for the two chamber parts to be pressed together by their own threaded connection. Separation of the two functions "sealing" and "interlocking" is essential.

The seal can be a molded elastomer seal into which a hard or soft inner ring is embedded, which ring rests directly against the joint. Because of the conical shape of the seal chambers, pressure is applied to the seal in an axial and a radial direction when the two chamber parts are pressed against one another.

If the two chamber parts support one another, it is practical that the positively interlock radially in the contact area. However, the two chamber parts can also support one another via an intermediate ring, a concave face on each side of which rests against the crowned, convex contact surface of the chamber parts. This facilitates angular offsetting between the socket on the machine side and the pipe end to be connected. In addition, the intermediate ring can consist of electrically non-conductive material, so that a non-conductive pipe connection can be produced when using insulated bolts.

It is furthermore advantageous that the clamp element consist of at least one slightly conically shaped disk, and that the wall of the clamp chamber running approximately parallel to the joint be adapted to the conicity of said disk. This makes it possible to transfer greater tensile forces to the pipe nozzles that are to be connected with one another, while maintaining the same dimensions, or to make the flange thinner, while maintaining the same force. This is particularly significant for aluminum connections or pipe connections in the plastics sector. The conical embodiment of the clamp elements, i.e., their angular position, even has an advantageous effect if the sections of pipe to be connected with one another are not exactly aligned. The angle formed between the two pipe axes can be so large that the one side of the clamp elements describe an angle of precisely 90° with the matching pipe axis when in working position, with the other half of the clamp element then describing an angle of less than 90° with the pipe axis.

For better centering, it is practical that the face of the chamber part fit into a corresponding recess on the flange. This recess is provided with a chamfer for easier installation, and has a size of only a few millimeters. With this solution, it is then advantageous that the wall of the recess, which runs approximately parallel to the joint, be adapted to the conicity of said disk.

The annular section of the disk-shaped clamp element can have an arc-shaped profile in its cross-section, which profile is inclined at an acute angle to the plane of the clamp element.

The flange on the pipe side can also be embodied in the form of a cuff having a female thread screwed onto a male thread on the flange on the machine side. In this case, the means of attachment between the two flanges therefore consists of a threaded connection 20, 21.

The means of attachment for connection of the flange on the pipe side to the flange on the machine side can, however, also consist of a split shell, which extends behind the two flanges to clamp them together. The split shell can then have axial collar stops. Furthermore, the flange on the pipe side can then have a conical lug on the side which faces away from the chamber part, against which lug a corresponding conically shaped collar of the shell rests.

In an alternative embodiment, the means of attachment for connection of the flange on the pipe side to the flange on the machine side can consist of a pipe section with a female thread that is screwed onto male threads provided on each of the two flanges. For this, a female simplex thread or a duplex thread can be used, in which latter case one of the two male threads on the flanges is right-handed and the other left-handed.

In order to produce a pipe connection according to FIG. 1, a flange 3, a clamp element 4 as well as a chamber part 5 are pushed onto a pipe end 2 which is to be butt-jointed with a free pipe socket 1. The chamber part 5 has an open, annular clamp chamber 7 facing the flange 3, and into which the clamp element 4 is inserted, which clamp element consists of a conical or convex disk having a radially interior clamp edge 4a which rests against the pipe end 2. An annular clamp surface 7a of the clamp chamber 7 extends around a radially exterior clamp edge 4b (see FIG. 3). In the unstressed state, the clamp element 4 projects beyond the frontal surface of chamber part 5. The form of the clamp elements 4 is selected in such a way that a force which presses the clamp elements against the rear of the clamp chamber 7 in an axial direction results in an increase in the outside diameter and at the same time in a decrease in the inside diameter of the clamp element.

Chamber part 5 is provided with a seal chamber 9, which is open in the direction of the joint 8 in each case (see FIGS. 3 and 5), with a conical shape, in other words which decreases in size in the direction of the adjacent flange 3.

The joint 8 is surrounded by a seal 6, which is embodied as a molded elastomer seal, into which an inner ring 10 is embedded. The outside contours of the seal 6 approximately match those of the two seal chambers 9,9', but are larger, so that when the two chamber parts 5,5' are pressed together, the pressure applied to the seal is directed inward in an axial and a radial direction.

Tightening is carried out, for example, by means of four screw bolts 11 which are disposed uniformly around the circumference of the flange, and which are inserted through the flange 3 (FIG. 2), or screwed into the flange 3' on the machine side (FIG. 1) as standing screw bolts.

In the embodiment according to FIG. 1, chamber part 5 on the pipe side is supported on the flange 3' on the machine side, which can also be formed by a section of the housing, is fixed in place and has a seal chamber 9' for the matching axial end of the seal 6. The seal chamber 9' at the same time forms the pipe socket 1. The annular contact surface 13 between the chamber part 5 and the flange 3' on the machine side has a crowned shape.

Figure 2:
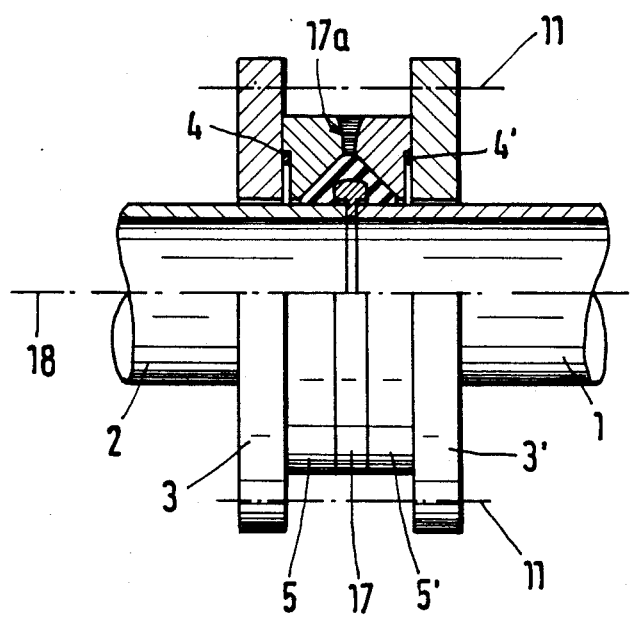
FIG. 2 shows a longitudinal section of an alternative embodiment of a pipe connection.

In the embodiment according to FIG. 2, a flange 3', a clamp element 4', and a chamber part 5' are also loosely pushed onto the pipe socket 1 on the machine side. The two chamber parts 5,5' support one another by means of an intermediate ring 17, which rests against a corresponding corwned, convex contact surface of the chamber parts 5,5' with a concave face 17a on each side.

Figure 3:
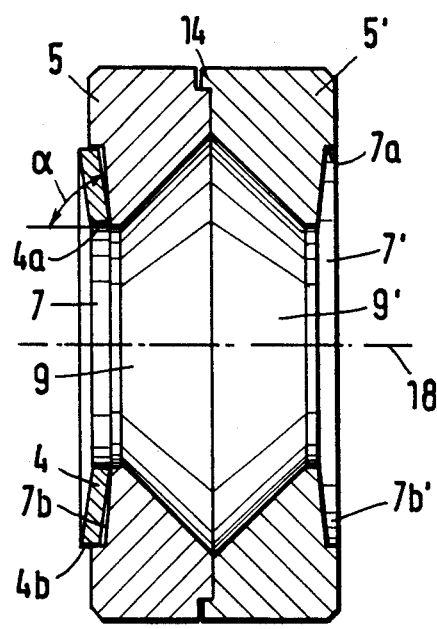
FIG. 3 shows a cross-section through two chamber parts one of which comprises a clamp element, on an enlarged scale.

In the embodiments shown in FIGS. 3 through 5, the two chamber parts 5,5' support one another and positively interlock radially with this radial interlocking consisting of a tongue-and-groove in the embodiment according to FIG. 3 and of lugs 15 which lock into recesses 16 in the embodiment according to FIGS. 4 and 5.

According to FIG. 3, the clamp element consists of at least one slightly conical or convex disk. The wall 7b or 7b' of the clamp chamber 7 or 7' describes an angle of less than 90° with the pipe axis 18, adapting to the conicity of said disk.

Figure 6:
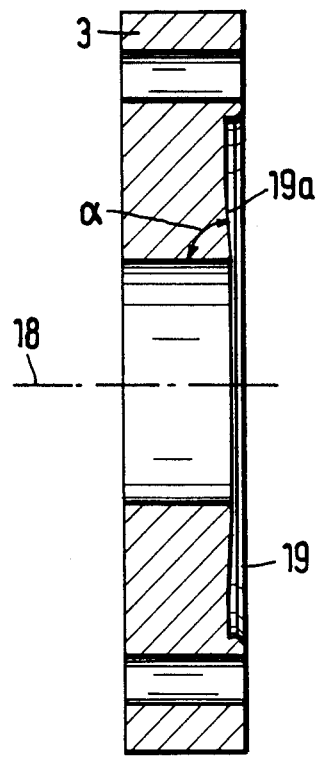
FIG. 6 shows a cross-section through a flange, having an alternative configuration.

In the embodiment according to FIG. 6, a recess 19 is provided in the flange 3 or 3', with which the face of the matching chamber part 5 or 5' interlocks. The recess has a chamfer to simplify insertion and centering of the chamber part. The wall 19a of the said recess 19, which runs approximately parallel to the joint 8, is also adapted to the conicity of the clamp element 4 or 4', and therefore describes an angle of less than 90° with the pipe axis 18.

Figure 7:
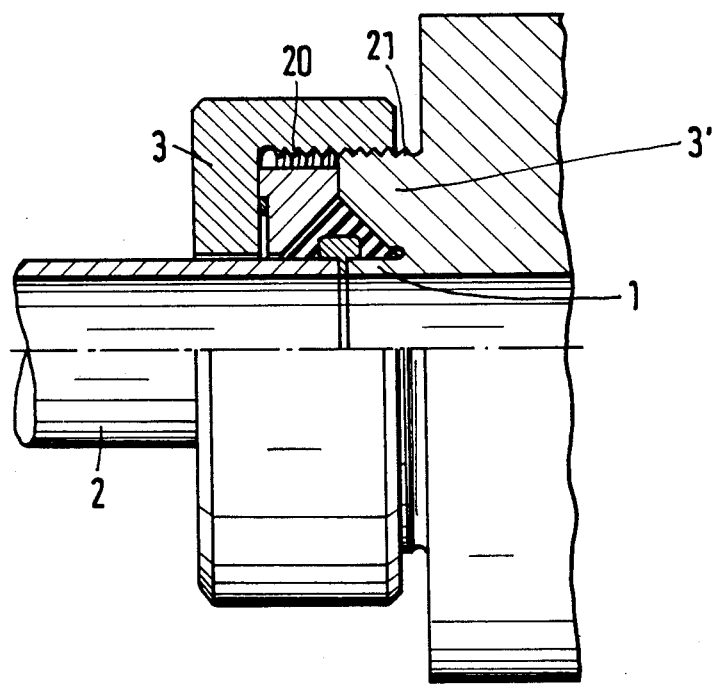
FIGS. 7-9 show longitudinal sections of alternative embodiments of pipe connections with a fixed flange on the machine side.
Figure 8:
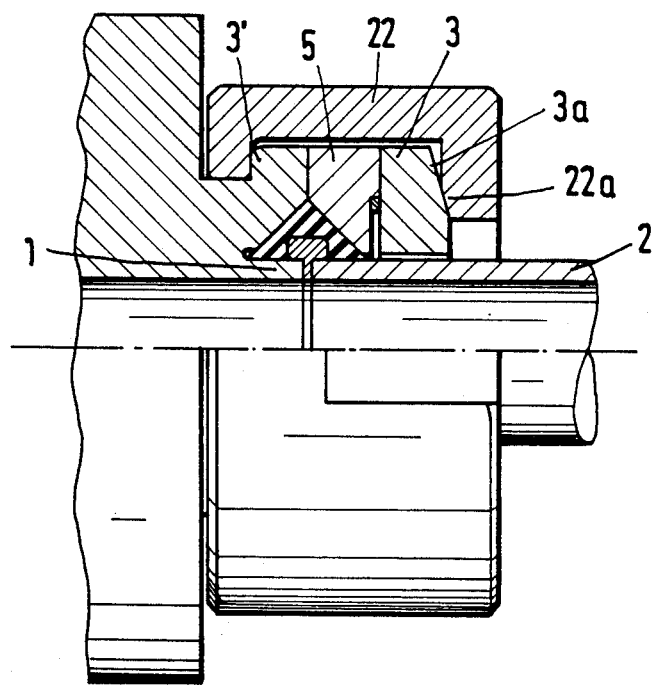
Figure 9:
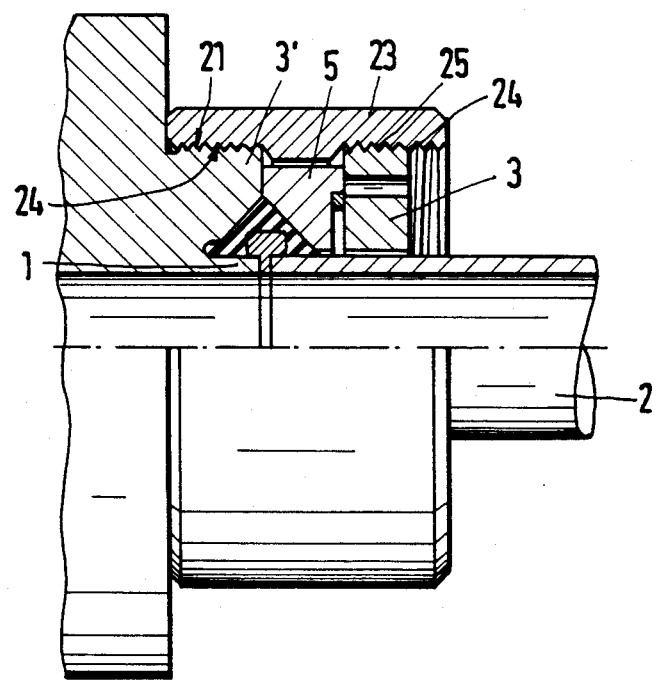

FIGS. 7 through 9 show alternative embodiments for the means of attachment for connecting the flange on the pipe side to the flange on the machine side.

In the embodiment according to FIG. 7, the flange 3 on the pipe side is embodied in the form of a cuff, a female thread 20 on which is screwed onto a male thread 21 of the flange 3' on the machine side.

In the alternative embodiment according to FIG. 8, said means of attachment consist of a split shell 22, which extends behind the two flanges 3,3' to clamp them together. Here, the flange 3 on the pipe side has a conical lug 3a on the side which faces away from chamber part 5, against which a corresponding conically shaped collar 22a of the shell 22 rests. The split shell 22 is provided with axial collar projections.

The solution shown in FIG. 9 uses a pipe section 23, a female thread 24 on which is screwed onto the two flanges 3,3', each of which is provided with a male thread 21 and 25.

What is claimed is:

1. A pipe connection for connecting an instrument or machine to a pipe end, said connection comprising:
    (a) a free socket having an outer perimeter and connected to a machine, said free socket forming a butt joint with a pipe end;
    (b) a chamber member surrounding said pipe end and including a first seal chamber;
    (c) a first flange fitted on said pipe end adjacent said first chamber member at a side opposite said butt joint;
    (d) a second flange surrounding said free socket and being fixed to said machine and supporting said chamber member;
    (e) a second seal chamber formed in said second flange and forming said free socket and mating to said first seal chamber;
    (f) a seal received in said first and second seal chambers;
    (g) a clamp chamber formed between said first chamber member and said first flange and having a clamp surface;
    (h) a clamp element positioned in said clamp chamber and having inner and outer clamp edges defining respectively inner and outer diameters, said inner clamp edge being engageable with said pipe end, said first clamp element having a longitudinal cross-section which projects axially out of said clamp chamber in an uncompressed form and which increases its outer diameter and decreases its inner diameter when axially compressed; and
    (i) means for applying an axial pressure to said clamp element, thereby increasing said outer diameter and decreasing said inner diameter to form a clamping seal on said pipe end.

2. A pipe connection as claimed in claim 1, wherein siad clamp surface of said clamp chamber overlaps said outer diameter of said clamp element, and wherein said clamp element projects out of said clamp chamber in a direction axial to said pipe end.

3. A pipe connection as claimed in claim 1, wherein said first and second seal chambers form a conical shape.

4. A pipe connection as claimed in claim 1, wherein said chamber member is supported on said second flange by a ring-shaped contact surface, and wherein said contact surface on said second flange includes a crowned shape.

5. A pipe connection as claimed in claim 1, wherein said first clamp element comprises at least one disk, shaped as a truncated cone.

6. A pipe connection as claimed in claim 5, wherein said clamp chamber includes an axial wall which extends at an angle less than 90° with respect to the axis of the pipe.

7. A pipe connection as claimed in claim 5, wherein said first flange includes a recess facing said first clamp chamber.

8. A pipe connection as claimed in claim 7, wherein said clamp chamber includes an axial wall which extends at an angle less than 90° with respect to the axis of the pipe, and said recess includes a wall portion which extends at the same angle as said axial wall of said clamp chamber.

9. A pipe connection as claimed in claim 1, wherein said seal comprises a molded elastomer surrounding an inner ring, and wherein said inner ring is positioned on said butt joint.

10. A pipe connection as claimed in claim 1, wherein said means for applying said axial pressure includes threaded means for urging said first and second flanges together.

11. A pipe connection as claimed in claim 10, wherein said urging means includes a cuff on said first flange having a female thread and a male thread on said second flange which matingly engages said female thread.

12. A pipe connection as claimed in claim 10, wherein said urging means includes a pipe section having a pair of female threads, and separate male threads on each of said first and second flanges which matingly engage a respective said female thread.

* * * * *